(12) United States Patent
Cameron et al.

(10) Patent No.: US 6,588,680 B2
(45) Date of Patent: Jul. 8, 2003

(54) SPRAY DEVICE FOR IRRIGATION

(75) Inventors: Scott G. Cameron, Escondido, CA (US); John C. Roberts, Carlsbad, CA (US)

(73) Assignee: Roberts Group Holdings LLC, San Marcos, CA (US)

( * ) Notice: Subject to any disclaimer, the term of this patent is extended or adjusted under 35 U.S.C. 154(b) by 0 days.

(21) Appl. No.: 09/916,480

(22) Filed: Jul. 27, 2001

(65) Prior Publication Data

US 2003/0019951 A1 Jan. 30, 2003

(51) Int. Cl.⁷ .............................................. A62C 31/22
(52) U.S. Cl. ...................... 239/276; 239/280; 239/523; 47/48.5; 248/87
(58) Field of Search ................................ 239/271, 273, 239/275, 276, 280, 521, 523, 589, 601, DIG. 1; 47/43, 44, 47, 48.5, 79; 248/87, 156, 159; 251/302

(56) References Cited

U.S. PATENT DOCUMENTS

| | | | |
|---|---|---|---|
| 2,939,637 A | 6/1960 | King | |
| 3,397,541 A | 8/1968 | Kersh | |
| 3,595,524 A | * 7/1971 | Mominee | ..................... 251/302 |
| 3,638,863 A | 2/1972 | Roberts | |
| 3,788,552 A | 1/1974 | Roberts | |
| 4,085,895 A | 4/1978 | Curry et al. | |
| 4,401,271 A | 8/1983 | Hansen | |
| 4,850,555 A | * 7/1989 | Lemkin et al. | ................ 248/87 |
| 4,852,806 A | * 8/1989 | Zeman | ......................... 239/176 |
| 5,158,231 A | * 10/1992 | Christen et al. | ............. 239/276 |
| 5,201,605 A | 4/1993 | Lang et al. | |
| 5,267,691 A | * 12/1993 | Zeman | ......................... 239/276 |

OTHER PUBLICATIONS

NETAFIM USA, 1999 Greenhouse and Nursery Price Catalog, p. 7.

* cited by examiner

Primary Examiner—Michael Mar
Assistant Examiner—Dinh Q. Nguyen
(74) Attorney, Agent, or Firm—Brown, Martin, Haller, Haller & McClain LLP

(57) ABSTRACT

An irrigation spray device has a substantially cylindrical peg for insertion into a water supply tube. A longitudinal water supply groove extends along the peg, with a water deflecting plate at one end of the groove for deflecting water traveling downwardly along the groove into an outwardly directed spray. The water deflecting plate has a smooth, convex curved or part-conical shape for forming a smooth, continuous, cone-shaped spray. The supply groove may be U-shaped for improved uniformity.

15 Claims, 2 Drawing Sheets

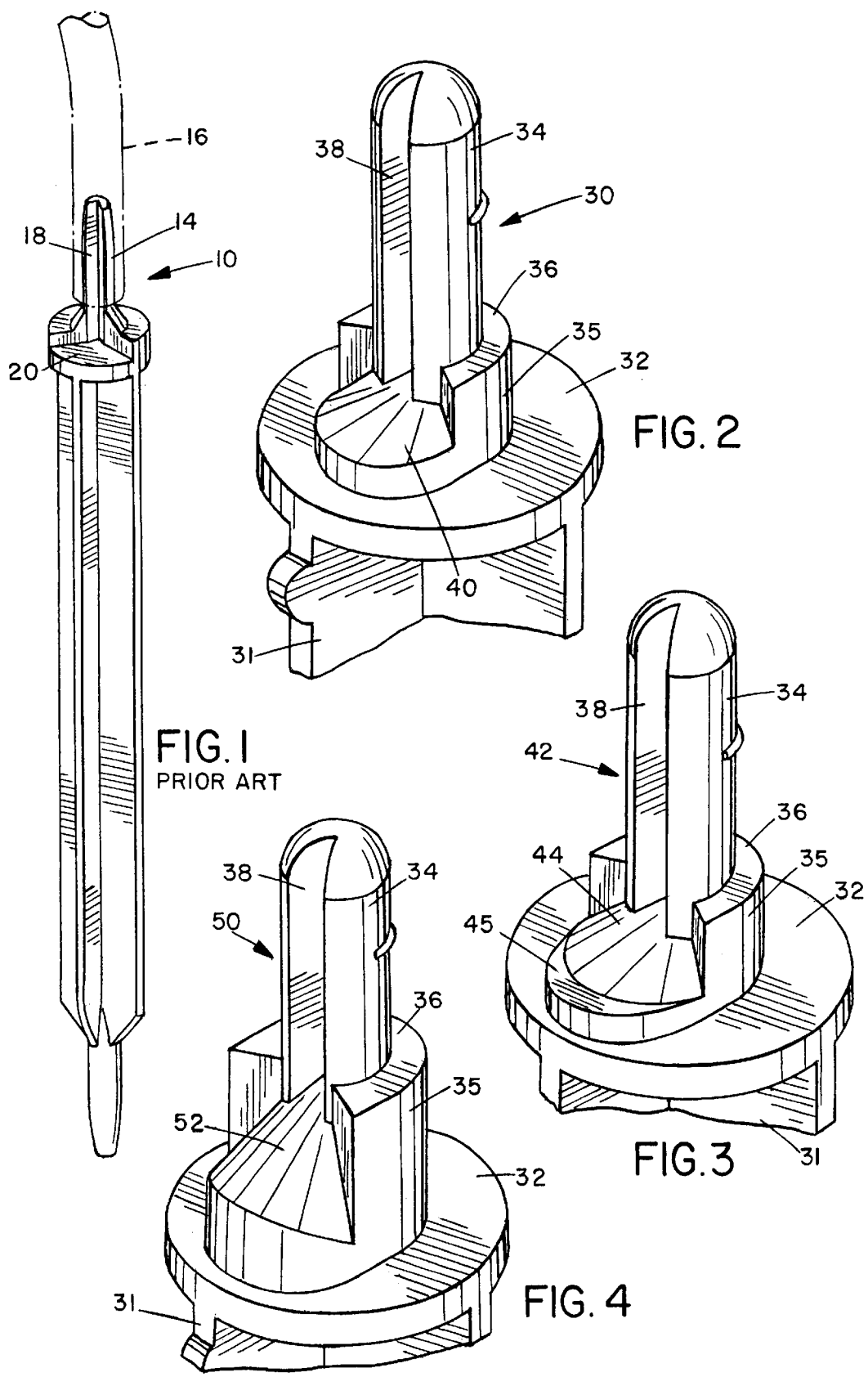

SPRAY DEVICE FOR IRRIGATION

BACKGROUND OF THE INVENTION

Figure 5:
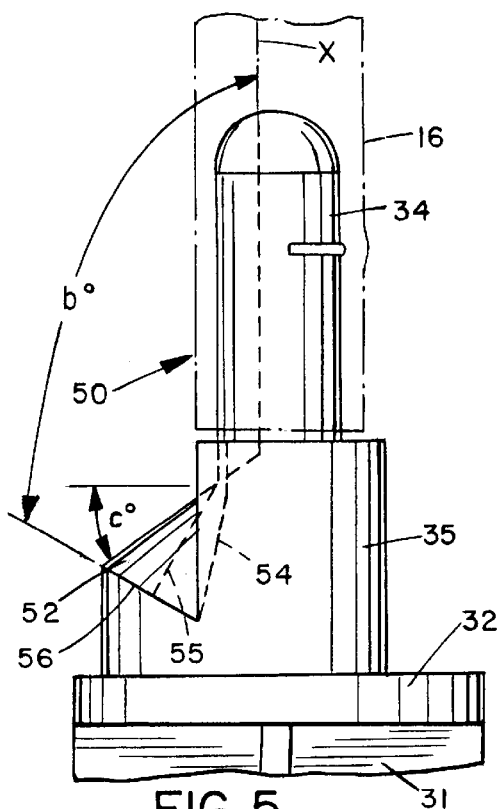

The present invention is concerned with a spray device for irrigation, and is particularly concerned with an irrigation spray stake device for irrigating landscape and/or nursery plants.

Existing irrigation spray stake devices typically have a vertical stake for embedding in the soil adjacent a plant to be irrigated, and a vertical peg projecting upwardly from the stake over which a small diameter, flexible plastic water supply tube is fitted. The peg has a vertical groove and a horizontally oriented deflector plate at the bottom of the groove. The tube covers most of the peg, but leaves a small portion of the groove uncovered at the bottom to allow water to exit. The pressurized water is deflected off the horizontal deflector plate into a fine spray. The deflector plate is typically flat and the supply groove is generally V-shaped. A spray device of this type is described, for example, in U.S. Pat. No. 3,638,863 of Roberts.

Spray stakes are manufactured in a precision injection molding process, which results in consistent and accurate parts. However, the water supply tubing used with the spray stakes may have larger manufacturing variations. Also, the end of the tubing is usually cut in the field by growers using scissors or wire cutters, and may not be cut straight across. As a result, the flow rate, spray pattern shape, and overall performance of the spray stake device will vary dependent on the properties and configuration of the water supply tube and cut end thereof. The V-shaped water supply grooves employed by existing spray stakes make contact with the tubing at the widest point in the groove, further increasing the dependency of performance on tubing properties.

V-shaped supply grooves also tend to deflect a large amount of water in a direction parallel to the angled walls of the V, causing the resultant spray pattern to have higher flow rates along the edges and lower flow rates in the center of the pattern. This will result in uneven watering, and is not desirable.

The deflector plate at the lower end of the supply groove of existing spray stake devices is typically flat and horizontal. In some devices, the plate is angled downward, but still flat, or may have a step which results in portions of the plate being at different angles. These existing deflector plates produce spray patterns which are not optimized for irrigating plants in nursery containers. Flat, horizontal deflector plates result in broad spray patterns which are larger than any practical container. The water then sprays into the edges of the containers and drips onto the soil in the edge, instead of uniformly covering the root zone of the plant. Also, the large amount of water along the edges of the container causes the soil to separate from the container and allows water to pass directly out of the container without going through the soil.

A downwardly sloping flat deflector plate with a small horizontal step at the bottom of the plate in the center of the spray pattern has also been used in past spray stakes. This directs the spray more uniformly throughout the container. Water on the edges of the spray pattern moves in a downwardly directed path, due to the downwardly sloping edges of the deflector plate, while water in the center of the spray pattern moves in a direction with less of a downward slope due to the horizontal step. The result is a cone shaped spray pattern which is desirable with nursery container plants. However, the step configuration tends to cause the spray pattern to be heavier at the side edges of the step, resulting in two heavy side streams and lighter coverage throughout the remainder of the container, which is undesirable.

SUMMARY OF THE INVENTION

It is an object of the present invention to provide a new and improved spray device for irrigation.

According to one aspect of the present invention, a spray device is provided which comprises, a substantially cylindrical peg for insertion into a water supply tube, a longitudinal water supply groove extending along the peg, the groove having opposite ends, and a water deflecting plate at one end of the groove for deflecting water traveling along the groove into an outwardly directed spray, the groove being of U-shaped cross-section and having a longitudinal opening directed radially outwardly from the peg. The peg may be mounted on a support body such as an elongated ground penetrating stem for supporting the peg upright adjacent a region to be watered.

The U-shaped groove will make contact with the supply tubing over a smaller area than a V-shaped groove for the same cross-sectional area, since the U-groove will be narrower at its outer extremity. Since flow rate is proportional to cross-sectional area, the performance of the spray device with a U-shaped groove will be more consistent and less dependent on the properties of the supply tubing and how the end is cut. The U-shaped groove will also have reduced tendency to divert water to the edges of the spray pattern, resulting in a more uniform spray and more consistent irrigation.

According to another aspect of the present invention, a spray device is provided which comprises, a substantially cylindrical peg for insertion into a water supply tube, a longitudinal water supply groove extending along the peg, the groove having opposite ends, and a water deflecting plate at one end of the groove for deflecting water traveling downwardly along the groove into an outwardly directed spray, the water deflecting plate having a smooth, convex curved shape.

In one exemplary embodiment, the water deflecting plate has a steeper downward slope at its outer edges than at the center of the plate. The plate may be of part conical shape, forming part of a cone which may be inclined at a non-perpendicular angle to the axis of the stake and peg. In one example, the conical shape forms part of a cone with the downward slope of the center of the plate inclined at an angle in the range from 20° to 50° to the horizontal direction. Due to the conical shape and tilt of the cone, the central portion of the deflecting plate will be at a more shallow angle than the outer edges of the plate, and the slope of the plate will move smoothly and progressively from the steep angle at the edges to the shallow angle at the center.

The water deflecting plate is designed to produce a smooth, continuous cone-shaped spray which is desirable for irrigation of nursery container plants. The absence of sharp steps eliminates the formation of heavy water streams within the spray pattern, and water splashing into the edges of the container will be minimized if the proper flow rate sprayer is selected.

The deflecting plate may have a flat, inclined portion or land extending around all or part of the bottom edge of the plate, in order to break up the spray and further direct it. The supply groove may be of V-shaped or U-shaped cross-section.

The conical shape deflecting plate in the spray device of this invention produces a more uniform and conical shaped spray which is desirable for watering plants in nursery containers. The shape of the plate is such that heavy water stream formation in the spray is substantially eliminated, and the spray can readily be arranged so that water will not splash into the container edges, reducing the risk of soil separation and water running out of the container without passing through the soil. The U-shaped supply channel, whether used alone or in conjunction with the shaped deflecting plate, provides greater flow control, and more consistent irrigation uniformity.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 1 is a perspective view of a prior art spray stake unit;

FIG. 2 is an enlarged perspective view of the top portion of an improved spray unit with a curved deflector plate according to an exemplary embodiment of the invention;

FIG. 3 is a view similar to FIG. 2, showing a curved deflector and flat land combination;

FIG. 4 is a view similar to FIG. 3, showing a modified conical deflector;

FIG. 5 is a side view of the structure of FIG. 4;

FIG. 6 is a top plan view of the unit of FIG. 5;

FIG. 7 is a perspective view similar to FIG. 4, with a U-shaped water channel;

FIG. 8 is a top plan view of the unit of FIG. 7; and

FIG. 9 shows a typical use of the spray unit.

DETAILED DESCRIPTION OF THE DRAWINGS

FIG. 1 illustrates a typical prior art sprinkler or spray stake device 10 comprising an elongated shaft or stake 12 for embedding in the ground, and a short peg 14 projecting from the upper end of stake 12 for attachment to a tube 16 supplying pressurized water to the device. The peg 14 is of circular cross-section and has a vertical groove 18 of V-shaped cross section which extends down to a horizontal deflector plate 20 at the lower end of the groove. The water supply tube 16 covers most of the peg 14, but leaves a small portion of the groove at the lower end of the peg uncovered to allow water to exit. The pressurized water exiting the bottom of the groove is deflected off the horizontal deflector plate into a fine spray. This results in a spray pattern which is not ideal for irrigating plants in nursery containers, since the resultant spray pattern is broader than any practical container.

FIG. 2 illustrates the upper end of a modified spray stake device 30 according to a first embodiment of the present invention. The stake portion 31 of the device will be identical to that of FIG. 1. The stake portion has an upper, flat end plate 32, and a vertical peg 34 of round cross section projects upwardly from end plate 32. The peg 34 has a larger lower end portion 35 of enlarged, oval or elliptical cross-section, with a flat step 36 between the larger, lower end portion and smaller diameter, cylindrical upper portion of the peg. The step 36 forms a stop or ledge for the end of a water supply tube, as will be described in more detail below.

The peg 34 has a vertically extending water supply groove 38 extending from its upper end, and part of the enlarged lower end portion 35 is cut away and shaped to form a convex, curved deflector plate 40 which intersects the lower end of the supply groove 38. The shape of plate 40 is a smooth, convex curved surface with the outward facing side at an angle to the horizontal direction, or flat end plate 32, such that the downward slope is steeper at the edges of the plate than at the center. The downward slope at the center of the deflector plate 40 may be zero in some cases, depending on the desired spray range. In general, the steeper the outer surface of the plate is inclined to the horizontal, the shorter the distance covered by the resultant spray, since the spray will be angled in a more downward direction for steeper angles.

A water supply tube 16 will be placed over the end of peg 34 in a similar manner to that illustrated in FIG. 1 until the lower end of the tube reaches step 36. Water supplied via tube 16 will then be directed downwardly along the groove 38 until it meets the deflector plate 40, where it will be directed outwardly into a spray. The shape of the deflector plate 40 is such that a smooth, continuous, cone shaped spray is produced, which is desirable for irrigation of nursery container plants.

FIGS. 3 to 5 illustrate some modified sprinkler units or spray devices which are similar to that of FIG. 2, and like reference numerals have been used for like parts as appropriate. However, the deflector plates of FIGS. 3 to 5 are different from that of FIG. 2 in order to produce modified conical spray patterns, dependent on the size of nursery container to be watered. FIG. 3 illustrates a spray device 42 in which a curved, convex deflector plate 44 is provided at the lower end of the supply groove. A flat portion or land 45 is provided around all or part of the bottom of the plate 44 to break up the spray and further direct it. The land is generally crescent shaped with elliptical edges. This will act to break up the spray, producing smaller droplets, and also makes the center of the spray more horizontal.

FIGS. 4 and 5 illustrate a modified spray device 50 in which the deflector plate 52 is at a much steeper angle than in FIGS. 2 and 3. As best illustrated in FIG. 5, the deflector plate is shaped to form part of the surface of a cone 54 which has a central axis 55 inclined or tilted relative to the vertical direction. In the illustrated embodiment, the central axis is tilted at an angle of around 30°, although it may be at different angles in alternative embodiments, dependent on the desired spray range. In FIG. 5, the base 56 of the cone is at a non-perpendicular angle b to the vertical axis x. In the embodiment illustrated in FIG. 5, the angle of base 56 is around 60°, although it may be a larger or smaller angle in alternative embodiments. In FIG. 7, the tilt angle of the base of the cone would be greater than 60°, with the cone itself approaching a vertical orientation. The tilt angle c of the center of the deflector plate 52 of FIGS. 4 and 5 to the horizontal direction is approximately 36°, although it may be in the range from 20° to 50°, and will be steeper towards the outer edges of the deflector plate.

Spray devices will be provided with deflector plates at a range of different tilt angles to provide different amounts of spray coverage, for different size nursery containers. In general, for a steeper cone angle, the spray will be directed more downwardly and have a smaller range, particularly at the edges of the spray.

Again, the spray device 50 of FIGS. 4 and 5 will produce a smooth, continuous cone shaped spray with a coverage dependent on the flow rate of water against the deflector plate. The flow rate will be dependent on the cross-sectional area of the supply groove 38, i.e. the cross-sectional area of the passageway formed by the groove and supply tube 16. In FIGS. 2 to 5, a conventional V-shaped supply groove 38 is used. As indicated in FIG. 6, a V-shaped groove 38 will make contact with the supply tube 16 at the widest portion of the groove, with an angle of contact a. Thus, a large portion of the outlet dimension is controlled by the properties and configuration at the end of tube 16, and flow rate variations may result from improperly cut supply tubes or tubes with manufacturing variations.

Figure 6:
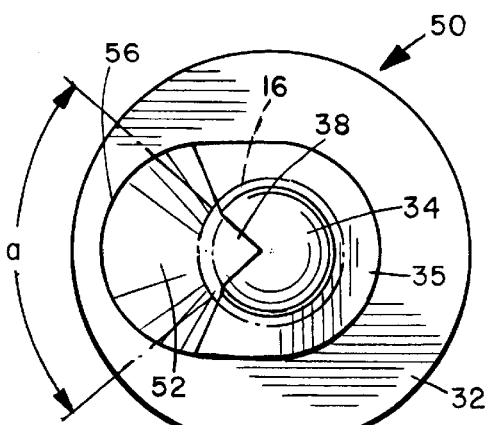
Figure 8:
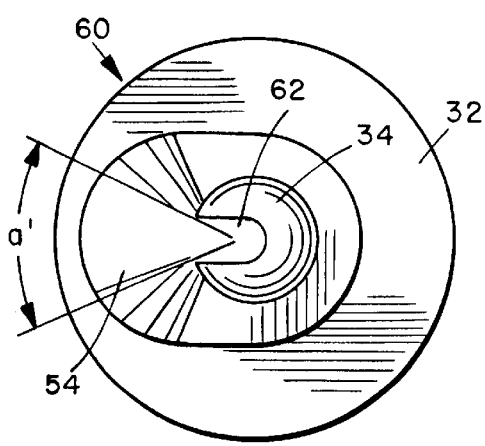
Figure 7:
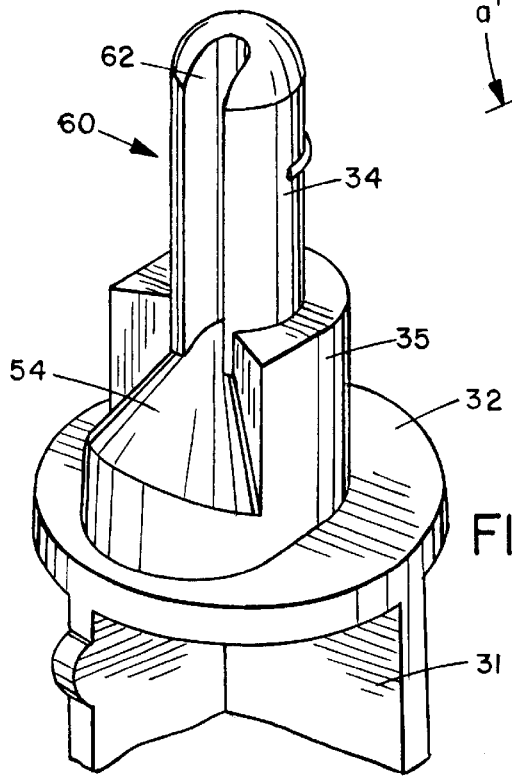

In the embodiment of FIGS. 7 and 8, a spray device 60 is provided which has a U-shaped supply groove 62. The embodiment of FIGS. 7 and 8 is otherwise identical to that of FIGS. 4 to 6, and like reference numerals have been used for like parts as appropriate. The U-shaped groove is dimensioned to have the same cross-sectional area as a corresponding V-shaped groove 38 if the same flow rate is desired. However, unlike a V-shaped groove, it will make contact with the supply tube 16 over a smaller area for a given groove cross-sectional area, and the angle a' of contact between the outer end of the groove 62 and the supply tube will be much less than the angle a of contact between a correspondingly sized V-shaped groove 38 and the tube. Thus, since flow rate is proportional to cross-sectional area, the performance of a spray stake device with a U-shaped groove will be more consistent and less dependent on the properties of the supply tubing, since a smaller area of the cross-section will be provided by the supply tubing.

Another advantage of using a U-shaped groove is that it will have less of a tendency to divert water to the edges of the spray pattern, since the side walls of the groove are not inclined outwardly. This results in better irrigation uniformity. It will be understood that the V-groove 38 in the embodiments of FIGS. 2 and 3 may also be replaced with a U-shaped groove of equivalent cross-sectional area for better uniformity.

Figure 9:
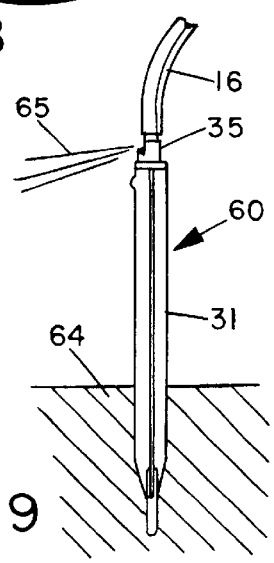

FIG. 9 illustrates the spray device of FIGS. 7 and 8 in use. The stake 12 will be partially embedded in the soil 64 of a nursery container, with the spray outlet directed towards a plant in the container. Water exiting the supply groove 62 will be deflected off the tilted, conical deflector plate 54 into a generally conical spray 65. The spray 65 will be more uniform and narrower than provided by past spray stake devices with flat deflector plates, such as the device illustrated in FIG. 1, and can be designed such that it will not spray into the edges of the container, by appropriate design of the cross-sectional area of the groove 62, and thus the flow rate of water, and by suitable modification of the angle of the conical deflector plate, with a steeper angle producing a smaller coverage area. The elimination of any sharp steps in the deflector plate avoids the formation of any heavy water streams within the spray pattern, so that the spray pattern is smooth, continuous, and generally uniform. If the proper flow rate spray device is selected, dependent on the size of the container to be irrigated, water splashing into the edge of the container can be minimized.

Although the illustrated embodiments each show a spray device with only one spray outlet, it will be understood that devices may be provided with two or more spray outlets, by providing more than one supply groove and deflector plate on the peg 34, directed in different directions. In practice, up to three outlets may be provided on the same peg. Additionally, although the illustrated embodiments all show spray devices mounted on ground penetrating stems, the peg with a longitudinal groove combined with a convex, curved deflector plate may be mounted on any body designed to support it for irritation purposes.

In one alternative embodiment, the peg 34 may be provided inside a hollow plastic stake which penetrates the ground, with the peg upside down from the configuration illustrated in the drawings. The water supply tubing is buried in the earth and runs upward through the hollow stake. The grooved peg 34 is then inserted downward into the tubing. This configuration keeps the tubing below the soil, which is desirable in landscape applications for aesthetic reasons. A prior art spray stake device with a conventional peg which is designed to keep the water supply tubing below the soil is the Spot-Spitter Top and Stake of Roberts Irrigation Co., of San Diego, Calif. The peg 34 of this invention may replace the existing peg of that device in one possible example. Alternatively, the grooved peg 34 may be incorporated as an integral part of the wall of a plant pot or other landscape container. The peg 34 of this invention may alternatively be incorporated in any suitable support body for orienting the groove and outlet in order to produce a properly directed spray.

Although some exemplary embodiments of the invention have been described above by way of example only, it will be understood by those skilled in the field that modifications may be made to the disclosed embodiments without departing from the scope of the invention, which is defined by the appended claims.

We claim:

1. A spray device, comprising:
    a substantially cylindrical peg for insertion into a water supply tube, the peg having a longitudinal axis and a longitudinal water supply groove extending along the peg and having a longitudinal, outwardly facing opening, the groove having opposite ends, and being of an U-shaped cross-section;
    a water deflecting plate at one end of the groove for deflecting water traveling along the groove into an outwardly directed spray; and
    a mounting device for supporting the peg in a generally upright orientation adjacent a region to be irrigated.

2. The device as claimed in claim 1, wherein the water deflecting plate is of a convex curved shape.

3. The device as claimed in claim 2, wherein the water deflecting plate has a shape forming part of a cone which is tilted relative to the longitudinal axis of the peg.

4. The device as claimed in claim 1, wherein the mounting device comprises an elongated, ground penetrating stem having a lower end and upper end, the peg projecting longitudinally from the upper end of the stem.

5. An irrigation spray device, comprising:
    a substantially cylindrical peg for insertion into a water supply tube, the peg having a longitudinal axis and a longitudinal water supply groove extending along the peg, the groove having opposite ends; and
    a water deflecting plate at one end of the groove for deflecting water traveling along the groove into an outwardly directed spray, the water deflecting plate having a central portion and outer edges, and being of a smooth, convex curved shape;
    the water deflecting plate having a steeper downward slope at its outer edges than at the central portion of the plate;
    the deflecting plate being of a part conical shape, and forming part of a cone which is inclined at an acute angle to the longitudinal axis of the peg; and
    the deflecting plate having opposite sides, and the central portion of the plate being tilted at a first tilt angle to the horizontal which is less than the tilt angles at the opposite sides of the deflecting plate.

6. The device as claimed in claim 5, wherein the conical shape forms part of a cone having a central axis inclined at an angle in the range from 20° to 50° to the longitudinal axis of the peg.

7. The device as claimed in claim 5, wherein the first tilt angle is in the range from 0° to 50°.

8. The device as claimed in claim 7, wherein the first tilt angle is in the range from 20° to 50°.

9. An irrigation spray device, comprising:

a substantially cylindrical peg for insertion into a water supply tube, the peg having a longitudinal axis and a longitudinal water supply groove extending along the peg, the groove having opposite ends; and a water deflecting plate at one end of the groove for deflecting water traveling along the groove into an outwardly directed spray, the water deflecting plate having a smooth, convex curved shape;

the convex curved shape of the deflector plate having a lower peripheral edge, and the deflector plate having a flat land portion at the lower edge of the convex, curved shape.

10. The device as claimed in claim 9, wherein the water deflecting plate has a center and has a steeper downward slope at its outer edges than at the center of the plate.

11. The device as claimed in claim 10, wherein the water deflecting plate is of a part conical shape, and forms part of a cone which is inclined at an acute angle to the longitudinal axis of the peg.

12. The device as claimed in claim 9, including a mounting device for supporting the peg in a generally upright orientation adjacent a region to be irrigated, the mounting device comprising an elongated, ground penetrating stem having a lower end and upper end, the peg projecting longitudinally from the upper end of the stem.

13. An irrigation spray device, comprising:

a substantially cylindrical peg for insertion into a water supply tube, and having a longitudinal water supply groove extending along the peg, the groove having opposite ends; and a water deflecting plate at one end of the groove for deflecting water traveling along the groove into an outwardly directed spray, the water deflecting plate having a smooth, convex curved shape;

a mounting device for supporting the peg in a generally upright orientation adjacent a region to be irrigated;

the mounting device comprising an elongated, ground penetrating stem having a lower end and upper end, the peg projecting longitudinally from the upper end of the stem; and the upper end of the stem comprising a flat plate, the peg having a lower end portion projecting upwardly from the flat plate and an upper end portion projecting from the lower end portion to the upper end of the peg, the lower end portion being of larger cross-sectional dimensions than the upper end portion, and a flat step being provided between the lower and upper end portions.

14. The device as claimed in claim 13, wherein the deflector plate comprises a cut-out region of the lower end portion of the peg which intersects the groove.

15. The device as claimed in claim 14, wherein the lower end portion is of an oval cross-section and the upper end portion of the peg is of a circular cross-section.

* * * * *